Figure 1:
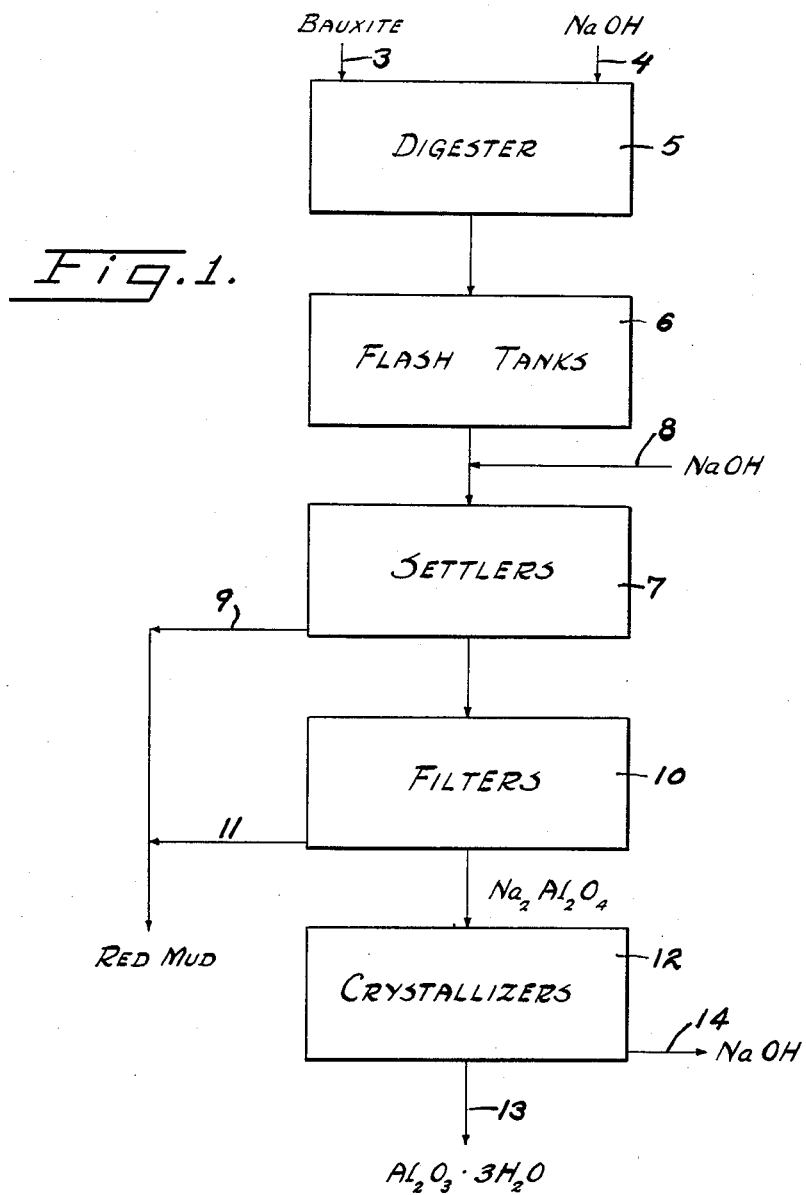

July 10, 1951      C. L. MOONEY      2,559,653
RECOVERY OF ALUMINA FROM ALUMINA-CONTAINING ORES
Filed Oct. 6, 1948      2 Sheets—Sheet 1

Inventor
Cloise L. Mooney
By James E. Toomey
agt.

Patented July 10, 1951

2,559,653

UNITED STATES PATENT OFFICE 2,559,653

RECOVERY OF ALUMINA FROM ALUMINA-CONTAINING ORES

Cloise L. Mooney, Baton Rouge, La., assignor to Kaiser Aluminum & Chemical Corporation, a corporation of Delaware Application October 6, 1948, Serial No. 53,090

6 Claims. (Cl. 23—143)

This invention relates to the extraction of alumina from alumina-bearing ores such as bauxite, and more particularly to an improvement in this process which will increase the capacity of a digester to dissolve the alumina.

In this process the alumina contained in the bauxite is dissolved in a caustic solution and this results in the formation of a super-saturated solution of a compound derived from the alumina which is generally regarded to be sodium aluminate. The particles of insoluble constituents of the ore remain suspended in this solution. These insoluble particles are generally separated from the solution containing the dissolved sodium aluminate by means of settlers and filters.

The solution containing the sodium aluminate, after its separation from the undissolved particles of the ore, is subjected to a crystallization operation by which alumina hydrate crystals are formed. These crystals are thereafter dried and calcined to obtain alumina as a final product.

It is apparent that it is important that no formation of alumina hydrate crystals occur during the passage of the slurry from the digester through the settlers and filters. If such premature crystallization occurred from the sodium aluminate solution, these crystals would be lost with the red mud, and this would obviously reduce the overall efficiency of the process.

To make certain that no formation of alumina hydrate crystals occurs during the settling and filtration of the slurry from the digester, it has heretofore been the practice to add an excess of caustic with the bauxite to the digester to make certain that the sodium aluminate all remains in solution even though the solution is cooled and becomes subjected to a progressively decreasing pressure following the digesting step. This excess of caustic has been provided because an increasing amount of sodium aluminate will remain in solution with an increasing concentration of the caustic.

Because of these limiting factors, it has not been possible to increase the capacity of a digester to handle a large volume of bauxite, inasmuch as it has been recognized that if an attempt were made to do this, premature precipitation of alumina hydrate would very likely occur during the settling and filtration operation.

In accordance with the present invention, the process is modified in such a way that the amount of bauxite which can be handled by a digester is materially increased. This is accomplished without requiring any additional digesting time and without requiring the addition of any plant equipment.

Generally considered, the invention involves the usual step of adding the alumina containing ore such as bauxite to a digester with a caustic solution. However, a greater amount of bauxite is added to the digester than would ordinarily be practiced, and this necessarily means that a smaller amount of caustic is added with the bauxite to the digester. Thus, although the total volume charged to the digester will be the same as in the conventional practice heretofore, the charge according to the present invention will consist of a greater amount of bauxite and a smaller amount of caustic.

In order to obtain complete digestion of this increased relative amount of bauxite with the relatively smaller amount of caustic, the digestion temperature and pressure are increased. This will result in the dissolution of the alumina content of the bauxite and the formation of the soluble-derived compound sodium aluminate in substantially the same time that heretofore would be required to dissolve the alumina content of a smaller amount of bauxite and its corresponding greater amount of caustic.

It would be thought that the considerably higher concentration of sodium aluminate in the resulting out-put from the digester would result in the premature precipitation of a large quantity of alumina hydrate crystals during the passage of this solution through the settlers and filters. Also, it would be thought that either a considerable amount of heat would be lost as a result of the practice of the present invention, because of the increased temperature of the digestion operation, unless additional heat exchangers or flash tanks were provided in the system before the solution is passed to the settlers.

To overcome this expected result, the invention contemplates the addition to the slurry from the digester, and before it reaches the first settler, of a relatively small amount of caustic. It is preferable that this added caustic be introduced into the slurry after its pressure has been reduced by the heat exchangers or flash tanks to substantially atmospheric pressure, and before its entry to the settlers.

This addition of caustic to the slurry from the digester has several advantages. Inasmuch as it will be relatively cool it will lower the temperature of the slurry from the digester to below the boiling point of the slurry so that the tendency of the slurry to flash into steam is reduced. This means that there is less likelihood that the steam which is generated will carry away with it any of the sodium aluminate contained in the solution. Also, the addition of the caustic in accordance with the present invention necessarily results in an increase of the caustic concentration of the slurry as it enters the settlers and filters, and this means, as is evident from the above discussion, that the capacity of this solution to maintain the sodium aluminate in solution will be increased. The tendency for premature precipitation of alumina hydrate crystals is, therefore, overcome.

Figure 2:
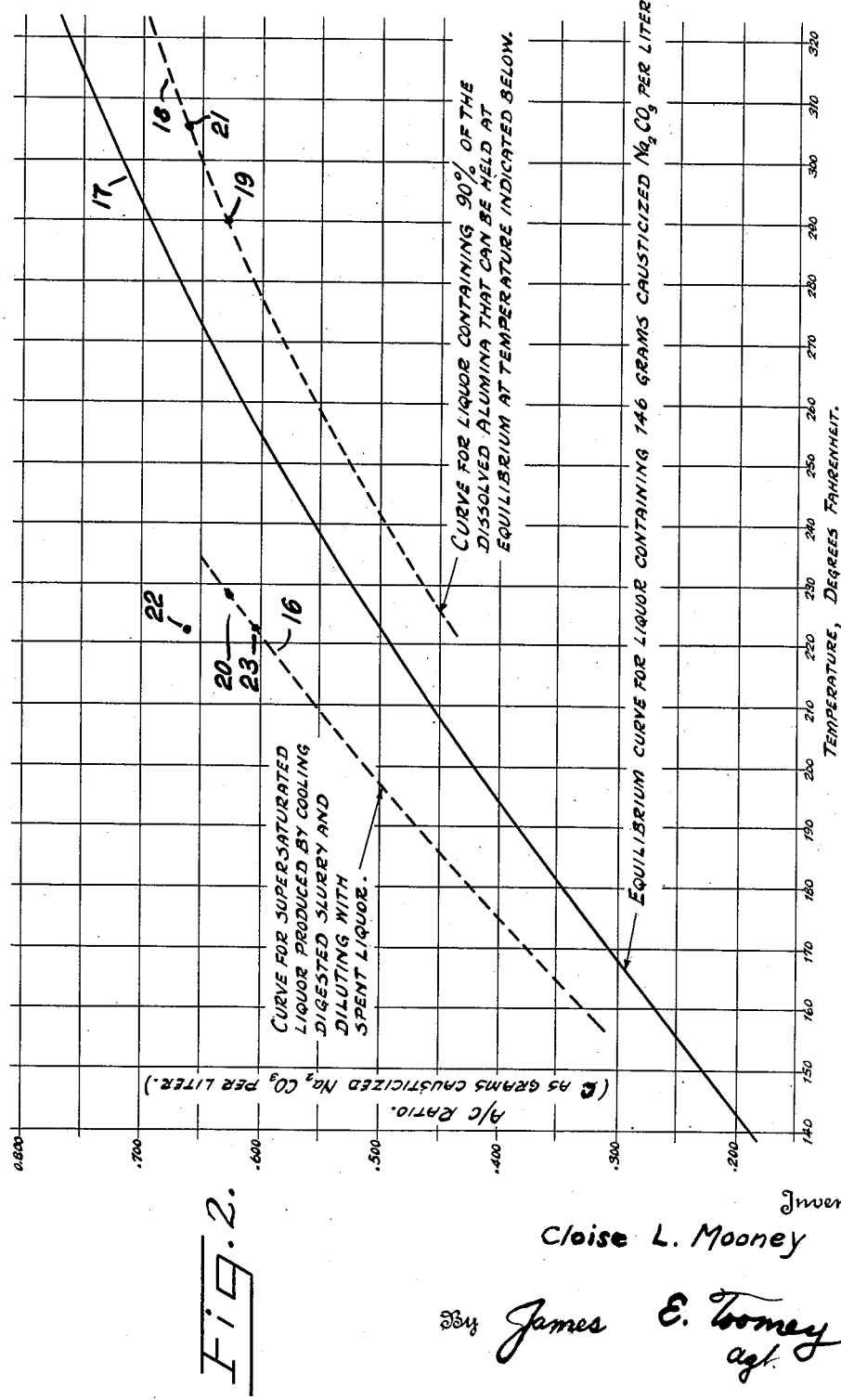

A more detailed description of the invention will be evident from a consideration of the accompanying drawings in which:

Figure 1 is a flow chart showing the steps in the process according to the invention, and, Figure 2 is a graph indicating the conditions which are met with in carrying out digestion process.

Referring first to Figure 1, bauxite is added as indicated at 3, and sodium hydroxide is added as indicated at 4, to the digester 5. As has been noted above, more bauxite and less sodium hydroxide is added to this digester than would be done according to conventional practice, and the change in this relationship will be explained later. The slurry from the digester is delivered through a series of heat exchangers and flash tanks, indicated at 6—so that the pressure of the solution is reduced to atmospheric pressure. The temperature of the solution is also lowered during its passage through these tanks.

From the last flash tank, the slurry passes through a series of settlers 7, but in accordance with the invention a sodium hydroxide solution is added to this slurry before it enters the settler 7, as is indicated at 8. As has been noted above, the addition of this caustic solution at 8 results in lowering the temperature of the slurry as it passes to the settlers so that the tendency of the slurry to flash into steam is reduced.

Some of the insoluble constituents of the slurry are removed by the settlers 7 and is discarded as red mud as is indicated by the line 9. The solution containing the dissolved sodium aluminate, which is not removed by the settlers, passes to the filters 10. The filters 10 serve to remove nearly all of the remaining mud from the solution, and this red mud is delivered from the filters as is indicated by the line 11.

The solution which issues from the final one of the filters 10, contains the dissolved sodium aluminate, and this passes to the crystallizers 12. In the crystallizers the sodium aluminate in the green liquor breaks down into alumina hydrate crystals which are removed as indicated at 13, and into hydroxide which remains in solution as is indicated at 14.

It may be mentioned at this point that the sodium hydroxide solution which is introduced at 8 in accordance with the invention is preferably obtained from the sodium hydroxide solution which issues from the crystallizers as indicated at 14. This caustic at 14 is necessarily at a relatively low temperature and its reintroduction into the system at 8 brings about the desired lowering of the temperature of the slurry before it enters the settlers 7. Also, it should be noted that the sodium hydroxide solution at 14 is reintroduced into the system at 4, along with some make-up caustic.

The sodium hydroxide which is added at 8 to the slurry, which will be recalled, performed the important function of assuring that formation of alumina hydrate crystals from the sodium aluminate solution will not occur during the passage of this solution through the settlers 7 and filters 10. This constitutes an important feature of the invention because, if crystals were to form in the settlers or filters, they would be removed at 9 or 11 with the red mud and would not be recoverable at 13, as is desired.

The amount of caustic, which is added at 4 and at 8 to practice the present invention is indicated by the graph of Figure 2. In this graph the axis of abscissas is temperature in degrees Fahrenheit and the axis of ordinates is a ratio indicated by A/C. This ratio indicates the relative amount in a given volume of solution of the quantity of alumina with respect to sodium hydroxide, the sodium hydroxide, however, being expressed in terms of causticized sodium carbonate. Thus, if the green liquor is found to contain 93 grams of $Al_2O_3$ and 113.2 grams NaOH, this amount of NaOH is regarded as being equivalent to 150 grams $Na_2CO_3$. The A/C ratio for this liquor would, therefore, be 93/150 or 0.620.

The curved line 16 in the graph of Figure 2 represents the greatest concentration of the sodium aluminate solution which may exist without the occurrence of precipitation of alumina hydrate crystals therefrom. If this concentration is exceeded, therefore, in the green liquor as it passes through the settlers and filters, it can be expected that alumina hydrate crystals will occur. Actually, the values of sodium aluminate or dissolved alumina in the graph of Figure 2 are expressed in terms of the alumina-to-caustic ratio (the latter in terms of equivalents of causticized $Na_2CO_3$), since the permissible maximum alumina concentration at any given temperature is directly dependent upon the caustic concentration. Thus, the A/C ratio is the true criterion of the stability of the caustic aluminate solution at a given temperature, because the maximum quantity of alumina which can be tolerated increases with increasing caustic concentration and vice versa.

The line 17 represents equilibrium conditions for a green liquor containing 146 grams of causticized $Na_2CO_3$ per liter. This is the amount of causticized sodium carbonate per liter of green liquor which occurs in general in present plant practice. The line 18 indicates the concentration of the sodium aluminate solution which is 90 per cent of the equilibrium curve of line 17. It is apparent that by operating along the conditions represented by the line 18, assurance is had that no formation of alumina hydrate will occur.

It will be recalled that at any given temperature sodium aluminate is stable only in a solution containing at least a definite excess of free caustic soda. A smaller excess is required at a higher temperature than at a lower temperature. When the solution contains only that minimum excess of caustic which corresponds to a given temperature it is said to be in equilibrium at the given temperaure and this is represented by the line 17. The condition is represented by the equation $$NaAlO_2 + 2H_2O \rightleftharpoons Al(OH)_3 + NaOH$$

when there is no net action to either side. Any lowering of the temperature of such a solution in equilibrium will upset the balance of reactants to give a net action to the right in the equation, i. e., so that some of the dissolved alumina is precipitated as hydrate. Concurrently, the proportion of free caustic goes up while the proportion of dissolved alumina decreases to that which can be held in equilibrium at the lower temperature. The premature decomposition of aluminate, as described, is prevented by the presence of a suitable excess of caustic. When the solution must be cooled, as it must be here, the necessity for a protective excess of caustic is apparent.

Before the present invention, a representative practice was to digest bauxite at about 290° F. in liquor containing just enough caustic to give an A/C ratio of about 0.625 at the end of digestion, i. e., when all of the available alumina of the bauxite was in solution. This is indicated by the point 19. The alumina content of the digester liquor was then ninety per cent of the content at equilibrium. Cooling then took place in flash tanks, and the liquor reached a safe degree of supersaturation (about 22.5%) without the need of dilution. This condition is indicated at point 20 on the graph. The slurry was then an acceptably stable supersaturation of liquor ready for the mud settling and filtering operation.

The process of this invention has made practicable an increase in alumina production by increasing the alumina content of the digester liquor. This is done by digesting at a higher temperature, then cooling and diluting. The digestion is done, for example, at 305° F. with liquor that gives an A/C ratio of 0.66, as indicated by point 21. It is cooled to a suitable temperature indicated by point 22 and then diluted by the addition of caustic, as indicated by 8 on Figure 1, until the ratio is indicated by point 23 on the curve, for an acceptably stable degree of supersaturation. Point 23 usually coincides with point 20, but is shown apart in order to simplify the graph. It will be noticed that point 22 is above the line 16 and that the dilution must bring the conditions to or below the line 16.

From the above example of one practice of the invention, it will be evident that wide variations can be made in obtaining the results of the invention. Thus, from the conditions which are apparent from Figure 2 it will be possible to operate the digester at any desired temperature, and after the slurry has been cooled to a desired temperature which will necessarily bring the conditions to a point above the line 16, it will merely be necessary to add sufficient caustic solution in accordance with the invention to bring the conditions down to or below the line 16. It may be observed that it is desirable there be no alumina hydrate crystals present in the caustic solution which is added at 8 in accordance with the invention as these crystals may bring about premature precipitation within the settlers and filters. This caustic solution may be clarified conveniently by means of suitable filters. It may also be observed that the make-up caustic which must be added to the digester at 5 along with the recycled caustic may be generated within the digester 5 by the common practice of adding the lime and soda ash to the digester.

The following is a specific example of my invention as applied to a continuous Bayer extraction process, employing starch as a flocculating agent for the suspended insolubles, and lime as a causticizing reagent. Finely ground bauxite was charged continuously to a digester together with lime, starch, aqueous caustic solution and steam at the maximum rate of 1760 pounds bauxite per minute, 11.44 pounds starch per minute, 55.4 pounds lime per minute, 2000 gallons used caustic per minute and 686 pounds steam per minute. Digestion was performed at 300° F. under a pressure of 65 pounds per square inch. The digested mixture was passed through flash tanks in which steam was exhausted from the digested mixture until the pressure and temperature were lowered to one atmosphere and 225° F., respectively. An additional 200 gallons of used caustic was added to the digested mixture to supply the requisite amount of caustic to prevent precipitation of alumina during separation of the insolubles, or red mud. After the red mud was separated the alumina solution was seeded with alumina and precipitated alumina was recovered at the rate of 876 pounds per minute.

When the digestion process was operated by the method used previous to that of my invention, in exactly the same equipment that was used for the example, only 800 pounds of alumina could be recovered per minute when operating at maximum capacity. Only 1600 pounds per minute of bauxite, 53.0 pounds per minute of lime, and 10.4 pounds per minute of starch could be charged to the digester together with the total requirement of caustic solution of 2000 gallons per minute. Thus, by the method of the invention, the rate of alumina production was increased from 800 to 876 pounds of alumina per minute without making any apparatus changes.

The use of the increased temperature not only allows increased loading of alumina in digester liquor but it gives an increase in the efficiency of causticization when inside causticization is practiced. The invention makes practicable the use of a temperature of digestion that is higher than any that could have been used before without expensive additions to the slurry-cooling equipment. The results are the previously-discussed increase in production capacity plus the improvement in efficiency of causticization.

I claim:

1. In a continuous process for extracting alumina from aluminous material in which the material is pressure digested at elevated temperatures with caustic liquor until substantially all of the available alumina is in solution, the digested slurry is cooled to a selected lower temperature and the insoluble residue is removed from the green liquor having an alumina-to-caustic ratio representing substantially the permissible maximum at the selected lower temperature without causing loss of alumina by premature precipitation, the improvement of increasing unit production without increasing unit digester capacity, which comprises increasing the charge of aluminous material to the digestion phase without increasing the flow of caustic liquor thereto thereby producing a green liquor having an alumina-to-caustic ratio in excess of the permissible maximum at the selected lower temperature, cooling the digested slurry to the selected lower temperature, and adding caustic liquor to the slurry to reduce the alumina-to-caustic ratio of the green liquor to substantially the permissible maximum.

2. A process according to claim 1 in which the permissible maximum alumina-to-caustic ratio is about .625.

3. A process according to claim 1 in which the digestion temperature is increased over the normal temperature of about 290° F. by an amount such that the alumina-to-caustic ratio of the green liquor does not substantially exceed about 90 per cent of the equilibrium saturation value at such digestion temperature.

4. In a continuous process for extracting alumina from aluminous ores in which the ore is digested with caustic liquor at elevated temperatures, the digested slurry is cooled to a selected lower temperature and the insoluble residue is removed from the green liquor, the improvement of increasing unit production without increasing unit digestion capacity which comprises increasing the charge of ore without increasing the flow of caustic liquor to the digestion phase, the flow of caustic liquor being maintained sufficient to dissolve substantially all of the available alumina during digestion to produce a green liquor having an alumina-to-caustic ratio such that precipitation of alumina would occur when the digested slurry is cooled to the selected lower temperature, cooling the digested slurry to said temperature, and adding caustic liquor to the cooled slurry to reduce the alumina-to-caustic ratio of the green liquor to prevent precipitation of alumina.

5. A process according to claim 4 in which the digestion temperature is increased over the normal temperature of about 290° F. by an amount such that the alumina-to-caustic ratio of the green liquor does not substantially exceed about 90% of the equilibrium saturation value at such digestion temperature.

6. A process according to claim 4 in which the caustic liquor added to the cooled slurry is at a lower temperature than the slurry thereby further cooling the same, and the addition of caustic liquor is maintained sufficient to reduce the alumina-to-caustic ratio of the green liquor to the permissible maximum for the final temperature attained by the digested slurry.

CLOISE L. MOONEY.

REFERENCES CITED

The following references are of record in the file of this patent:

UNITED STATES PATENTS

| Number | Name | Date |
|---|---|---|
| 2,143,310 | Fulda et al. | Jan. 10, 1939 |